March 31, 1925.  1,531,343

R. NAITO

DEVICE FOR PREVENTING THE ADHESION OF RAW SILK AT REEL ANGLES

Filed April 18, 1923

Inventor:
R. Naito

Patented Mar. 31, 1925.

1,531,343

UNITED STATES PATENT OFFICE.

RYOICHI NAITO, OF KOBE, JAPAN, ASSIGNOR TO KANEGAFUCHI BOSEKI KABUSHIKI KWAISHA, OF TOKYO, JAPAN.

DEVICE FOR PREVENTING THE ADHESION OF RAW SILK AT REEL ANGLES.

Application filed April 18, 1923. Serial No. 632,996.

*To all whom it may concern:*

Be it known that I, RYOICHI NAITO, a subject of the Empire of Japan, and resident in care of business department of The Kanegafuchi Boseki Kabushiki Kwaisha, Higashi-Shiri-Ike, Kobe, Japan, have invented certain new and useful Improvements in Devices for Preventing the Adhesion of Raw Silk at Reel Angles, of which the following is a specification.

My invention relates to devices for preventing silk thread from adhering to the reels and is especially adapted for use in connection with silk reeling machines of the type reeling directly on the hank making swift.

According to the usual method of silk reeling the raw silk is wound while in a wet condition on the reel with the result that the thread adheres to the reel and also the layers of silk stick together.

According to the present invention raw silk is passed through a tube before being wound on the reel and dry hot air is supplied to and flows through the tube in a direction opposite to the movement of the silk whereby the latter is heated and its moisture is evaporated. After passing through the tube, the raw silk is again exposed to the atmosphere and is thus cooled and its sericin or silk gelatin is solidified, and it is finally wound on the reel. Thus the adhesion of raw silk to the reel is positively avoided.

Figure 1:
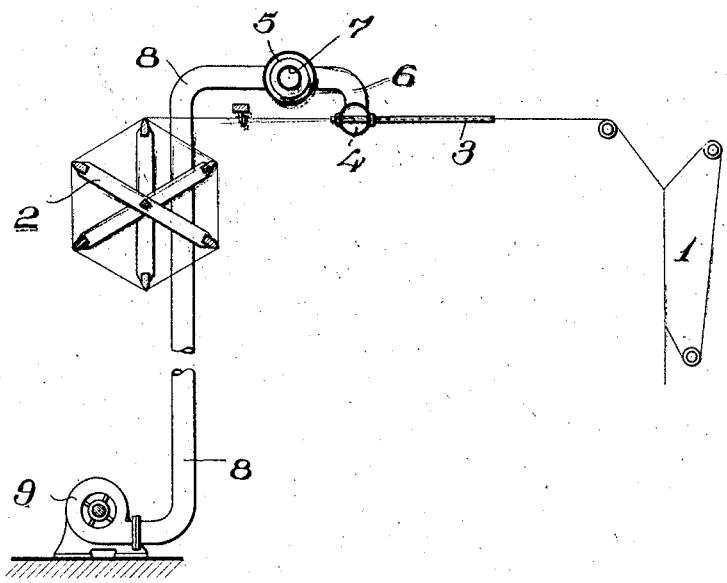
Figure 2:
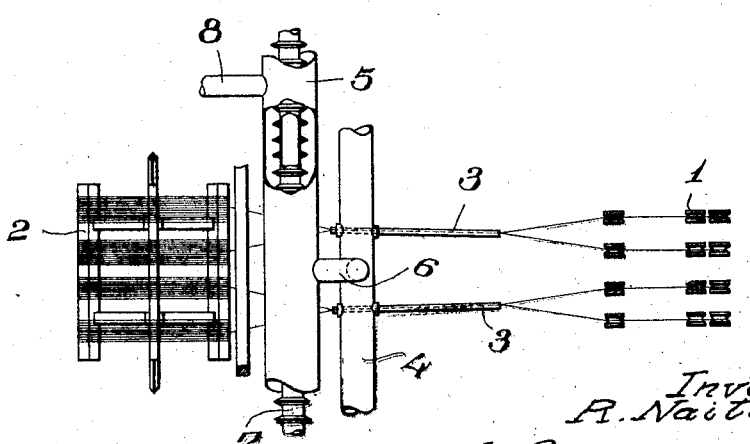

The accompanying drawing illustrates an example of the device embodying the present invention. Fig. 1 is a side elevation and Fig. 2 is a plan view of same. In the drawing (1) represents a Kennel apparatus. Raw silk passes from said Kennel apparatus to the reel (2) as in the known reeling machines of the direct reeling type. (3) represents hot air tubes of suitable size and length, connected with a main pipe (4) and positioned between the Kennel apparatus 1 and the reel 2, raw silk is made to pass through said tubes (3). (5) is a hot air chamber connected with the main pipe (4) by an elbow pipe (6). Within the heating chamber (5) a suitable heating means, for instance steam pipe (7), is provided and the air passing through said chamber is thereby heated to a desired temperature. A supply pipe (8) delivers air from a blower 9 to the chamber 5.

The raw silk leaving the Kennel apparatus (1) passes to the hot air tubes (3) in its moist state, and after passing through said tubes is exposed again to atmosphere, and then is wound on the reel 2, the air is supplied to the chamber (5) through the pipe (8) by means of the blower (9), and after having been heated to the desired temperature by the heating pipe (7) flows into the main pipe 4 and into the tubes (3). The hot air flows along the raw silk in the tubes 3 in a direction opposite to the motion of raw-silk, and escapes at the other end of the tube.

The raw silk in its moist state therefore, coming in close contact with the current of hot air while passing through the tube (3), before being wound on the reel, is heated and rapidly and thoroughly dried. The current of hot air and the motion of raw silk being opposite to each other, the drying action is remarkably accelerated. Thus the raw silk is wound on the reel after having been thoroughly dried, and consequently there is no danger of the silk adhering to the reel nor of the layers of silk sticking together. The drying action of the heated air has no harmful effect on the silk but on the contrary improves the quality thereof.

I claim:—

1. In combination with a silk reeling device, hollow members adapted to receive silk thread during its passage to the reeling device, and means for supplying heated air to said hollow members.

2. An arrangement as claimed in claim 1 characterized in that the heated air is caused to travel through the hollow member in a direction opposite to the movement of the thread therethrough.

3. An arrangement as claimed in claim 1 characterized in that the hollow member is arranged in spaced relation to the reeling device whereby the thread, subsequent to its passage through the hollow member passes for a distance through the atmosphere prior to its being wound upon the reeling device.

4. An arrangement as claimed in claim 1 characterized in that the hollow member is arranged in spaced relation to the reeling device and that the heated air is caused to pass through the hollow member in a direction opposite to the movement of the thread therethrough.

5. In an apparatus of the character described, a reeling device, a hollow member adapted to receive thread passing through said reeling device, a heating chamber connected with the hollow member, air heating means located at said chamber, and means for supplying air through the heating chamber and hollow member.

6. An apparatus of the character described comprising a silk reeling machine, a plurality of hollow members arranged adjacent the reeling machine and adapted to receive silk thread passing thereto, a main pipe connected with the several hollow members, a heating chamber connected with the main pipe, air heating means located in said chamber, and means for supplying air to the heating chamber.

In testimony whereof I have affixed my signature in presence of two witnesses.

RYOICHI NAITO.

Witnesses:
W. C. CIPARAH,
ICHIRO LUDZUK.